United States Patent [19]

Lippert

[11] 4,081,166
[45] Mar. 28, 1978

[54] SECURING SWING HOOK

[76] Inventor: Strohm Eamil Lippert, P.O. Box 305, Big Bear City, Calif. 92314

[21] Appl. No.: 702,602

[22] Filed: Jul. 6, 1976

[51] Int. Cl.² .............................................. F16B 45/00
[52] U.S. Cl. ................... 248/306; 211/59.1; 211/100; 248/294; 248/341
[58] Field of Search ............... 248/218.1, 290, 294, 248/304, 305, 308, 341, 306, DIG. 3; 108/30; 211/47, 48, 54.1, 57.1, 59.1, 105.1, 105.2, 124, 99, 100

[56] References Cited

U.S. PATENT DOCUMENTS

| 802,705 | 10/1905 | Parker | 248/304 X |
|---|---|---|---|
| 819,311 | 5/1906 | Purvis | 211/13 |
| 1,376,546 | 5/1921 | Jeep | 248/304 |
| 1,999,218 | 4/1935 | Tiryakian | 248/304 |
| 2,684,226 | 7/1954 | Sundell et al. | 248/294 |
| 2,987,289 | 6/1961 | Wamsley | 248/304 X |

FOREIGN PATENT DOCUMENTS 752,772   9/1933   France .................. 211/104

Primary Examiner—Roy D. Frazier
Assistant Examiner—William E. Lyddane
Attorney, Agent, or Firm—Larson, Taylor and Hinds

[57] ABSTRACT

A securing or latching supporting hook comprises a U-shaped hook member adapted for rotation about a horizontal axis and having an elongated distal leg portion which cooperates with a generally horizontally extending member to provide a latching effect. The hook member is rotatably mounted such that in the rest position thereof, the hook member lies in a vertical plane with the curved or bight portion thereof in a lowermost position. When in the rest position, the tip of the distal leg portion is disposed in proximity to the horizontal member so as to prevent accidental removal of articles hung on the hook member. The hook member is rotated to a release position, wherein the distal end is remote from the horizontal member to permit removal of articles from the hook member.

3 Claims, 3 Drawing Figures

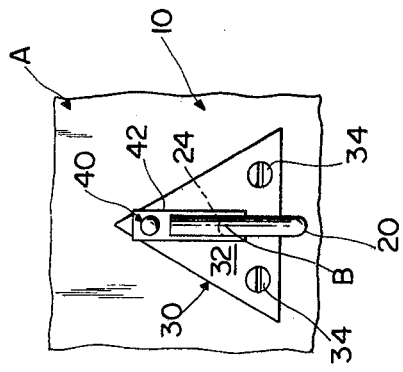
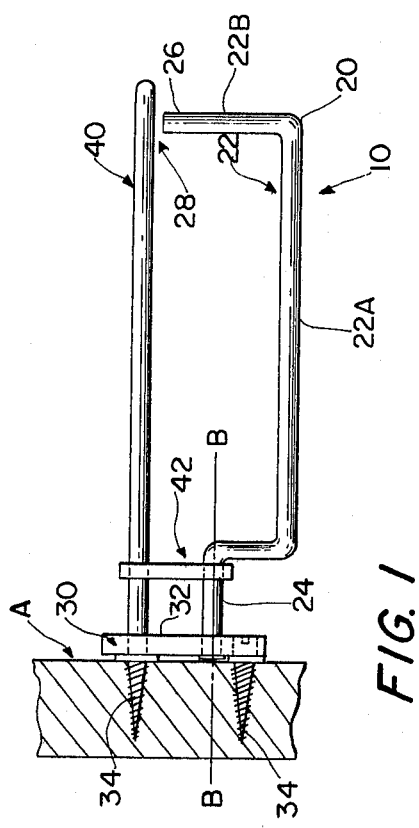
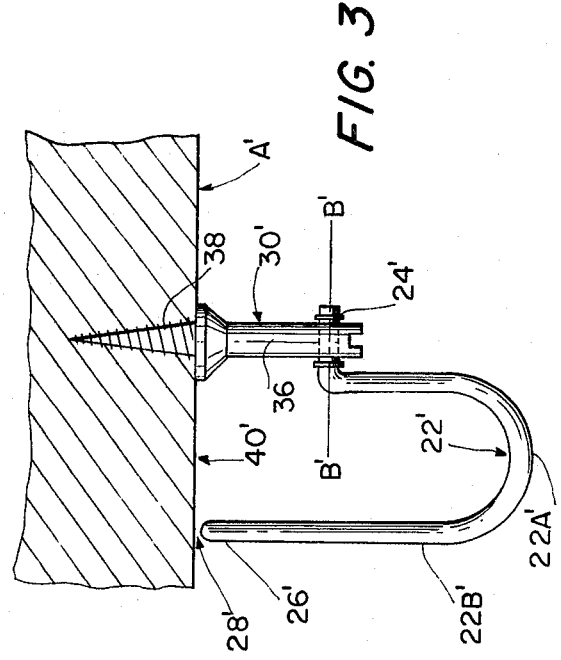

SECURING SWING HOOK

FIELD OF THE INVENTION

This invention relates generally to supporting hooks and more particularly to a rotatable securing hook.

DESCRIPTION OF THE PRIOR ART

Typically, conventional supporting hooks are provided with fixed, open throats and articles supported on such hooks are relatively easily dislodged. On the other hand, conventional supporting hooks which secure or otherwise positively support the article or articles hung thereon are relatively complex devices, such devices being typically provided with spring biased members for closing the hook throat. These devices are expensive and difficult to manufacture, and are subject to wear and malfunction.

SUMMARY OF THE INVENTION

These and other disadvantages of the prior art are overcome by the securing hook of the present invention which includes a U-shaped hook member adapted for rotation about a generally horizontal axis such that a stable, substantially vertically oriented rest position is normally assumed wherein the curved or bight portion of the hook member is in a lowermost position. The hook member also has an elongated distal leg portion which cooperates with a generally horizontally extending member such that, with the hook member in the rest position, the tip of the distal leg portion is disposed in proximity to the horizontal member so as to prevent accidental removal of articles hung on the hook member. The hook member is rotated to a release position, wherein the distal end portion is remote from the horizontal member, to permit removal of articles from the hook member.

In one embodiment of the present invention, the supporting surface is generally horizontal and downwardly facing, and constitutes the horizontally extending member. Advantageously, the present invention may further comprise a collar depending from the horizontal member which rotatably suports the hook member at a position spaced from the mounting surface.

Other features and advantages of the invention will be set forth in, or apparent from, the detailed description of the preferred embodiments found hereinbelow.

BRIEF DESCRIPTION OF THE DRAWINGS

FIG. 1 is a side elevational view of a first embodiment of a securing hook constructed according to the present invention.

FIG. 2 is an end view of the securing hook illustrated in FIG. 1.

FIG. 3 is a side elevational view of a second embodiment of a securing hook constructed according to the present invention.

DETAILED DESCRIPTION OF THE PREFERRED EMBODIMENTS

Referring to FIGS. 1 and 2, a first embodiment of a securing hook constructed according to the present invention is generally denoted 10 and comprises a hook member 20, a mounting base 30 for mounting hook member 20 on a generally vertical supporting surface A, and a generally horizontally extending member 40, which cooperates with hook member 20 in a manner to be described hereinbelow.

Hook member 20 includes a generally U-shaped intermediate portion 22, which, as shown, has an elongated, curved or bight portion 22A. Hook member 20 also includes a first end portion 24 which is adapted for rotatable mounting on base 30, such that hook member 20 has a generally horizontal axis of rotation B—B, and assumes a first rest position wherein intermediate portion 22 is substantially vertically oriented with the curved or bight portion 22A thereof in the lowermost position. Hook member 20 also includes a second, elongated end portion 26 which forms an extension of the distal leg portion 22B of intermediate portion 22. End portion 26 is so constructed that when hook member 20 is in the rest position, the tip 26A of end portion 26 is disposed in proximity to horizontally extending member 40, thereby forming a constricted "throat" 28 between tip 26A and member 40 which prevents accidental removal of an article (not shown) which has been hung on hook member 20. An article which is adapted for hanging on hook member 20 is provided with a passageway through which hook member 20 may be inserted, and when properly hung, the article is positioned on the intermediate portion 22 of hook member 20.

Mounting base 30 comprises a plate 32 and anchoring members 34 which affix plate 30 to surface A in spaced relationship, as shown in FIG. 1, so as to provide for rotatable mounting of hook member 20. While shown as a pin in the embodiment of FIGS. 1 and 2, end portion 24 of hook member 20 may also be in the form of a hinge, ball joint, or universal joint, or other conventional rotatable mounting, in which case, plate 32 need not be spaced from surface A. In addition, although anchoring members 34 are shown in the embodiment of FIGS. 1 and 2 in the form of screws, members 34 may be hook shaped so as to facilitate affixing of base 30 to a pegboard surface, or in other conventional forms to facilitate anchoring of base 30 to particular surfaces.

Horizontally extending member 40 may be the form of a rod, as shown, fixedly mounted on base 30 in relative alignment with the axis of rotation B–B of hook member 20, or may be in the form of a horizontally extending, downwardly-facing surface. Member 40 may also be provided with a depending collar 42 which rotatably supports the end portion 24 of hook member 22 at a position spaced from plate 32 of base 30.

Referring to FIG. 3, a second embodiment of a securing hook constructed according to the present invention will now be described. The embodiment of FIG. 3 includes elements similar to those of the embodiment of FIGS. 1 and 2, and these elements have been given the same reference numbers, with primes attached. It is to be noted that the embodiment of FIG. 3 is adapted for mounting on a generally horizontal, downwardly-facing supporting surface A', as opposed to the embodiment of FIGS. 1 and 2, which is adapted for mounting on a generally vertical supporting surface A. Mounting base 30' may advantageously be in form of a post 36 with an end portion 38 comprising a screw for anchoring base 30' in supporting surface A'. End 37 of post 36 may advantageously be slotted, as shown, to facilitate mounting of base 30' in surface A'. Surface A' may also advantageously constitute horizontally extending member 40.

In operation, hook member 20 is rotated clockwise or counterclockwise to a release position wherein the throat 28 (or 28') is enlarged sufficiently to allow receipt of the article to be hung on hook 10. As noted hereinabove, the article is positioned on the intermediate portion 22 of hook member 20. The weight of hook member 20, together with that of the article being supported, cause hook member 20 to rotate to the rest position, thereby securing the article on the hook until hook member 20 is rotated to the release position by the operator.

It will be appreciated by those skilled in the art that although the invention has been described relative to exemplary embodiments thereof, modifications and variations can be effected in these embodiments without departing from the scope and spirit of the invention.

I claim:

1. A securing hook for releasably supporting an article, comprising, in combination, hook means, mounting means for mounting said hook means on a supporting surface, and a generally horizontally extending member, said hook means comprising a generally U-shaped intermediate portion having first and second leg portions connected by a curved bight portion, a first end portion connected to said first leg portion and adapted for rotatable mounting on said mounting means such that said hook means has a generally horizontal axis of rotation lying in a plane defined by said first and second leg portions and rotation of said hook means causes displacement of said U-shaped intermediate portion away from a first stable rest position wherein said U-shaped portion is substantially vertically oriented with the curved portion thereof in a lowermost position, and a second elongated end portion forming an extension of said second leg portion of said U-shaped portion and so constructed that when said hook means is in said rest position, the tip of said second end portion is disposed in proximity to said horizontally extending member so as to prevent accidental removal of an article when said hook means is in said rest position, and to allow removal of an article when said hook means is rotated to a second release position wherein the tip of said second end portion is remote from said horizontally extending member.

2. The securing hook of claim 1 wherein the surface is generally horizontal and downwardly facing, and constitutes said horizontally extending member.

3. The securing hook of claim 1 further comprising a collar depending from said horizontally extending member and rotatably supporting said first end portion of said hook means at a position spaced from said mounting means.

* * * * *